United States Patent [19]

Kronzer

[11] Patent Number: 4,863,781
[45] Date of Patent: Sep. 5, 1989

[54] MELT TRANSFER WEB

[75] Inventor: Frank J. Kronzer, Marietta, Ga.

[73] Assignee: Kimberly-Clark Corporation, Neenah, Wis.

[21] Appl. No.: 243,221

[22] Filed: Sep. 2, 1988

Related U.S. Application Data

[63] Continuation of Ser. No. 8,013, Jan. 28, 1987, abandoned.

[51] Int. Cl.$^4$ .............................. B32B 7/06
[52] U.S. Cl. ................... 428/200; 428/211; 428/484; 428/913; 428/914
[58] Field of Search ............... 428/484, 913, 914, 200, 428/211, 216

[56] References Cited

U.S. PATENT DOCUMENTS

| | | | |
|---|---|---|---|
| 3,567,571 | 3/1971 | Martinovich | 161/206 |
| 3,574,049 | 4/1971 | Sander | 161/220 |
| 3,952,131 | 4/1976 | Sidemann | 428/334 |
| 4,235,657 | 11/1980 | Greenman et al. | 156/234 |
| 4,253,838 | 3/1981 | Mizuno et al. | 8/471 |
| 4,395,905 | 7/1983 | Boyd et al. | 428/914 |
| 4,496,618 | 1/1985 | Pernicano | 428/201 |
| 4,511,602 | 4/1985 | Margerum | 427/148 |
| 4,515,849 | 5/1985 | Keino et al. | 428/201 |
| 4,536,434 | 8/1985 | Magnotta | 428/200 |
| 4,548,857 | 10/1985 | Galante | 428/914 |
| 4,555,436 | 11/1985 | Geurtsen et al. | 428/200 |
| 4,557,964 | 12/1985 | Magnotta | 428/187 |
| 4,604,153 | 8/1986 | Melbye | 428/914 |

Primary Examiner—Edith Buffalow
Attorney, Agent, or Firm—Patrick C. Wilson

[57] ABSTRACT

A melt transfer web has a conformable layer which enables the melt transfer web to be used to transfer print uneven surfaces. In one embodiment the melt transfer web has a separate conformable layer and separate release layer. The conformable layer consists of copolymers of ethylene and vinyl acetate or copolymers of ethylene and acrylic acid which copolymers have a melt index greater than 30. The release layer consists of polyethylene films or ethylene copolymer films. In another embodiment a single layer of copolymers of ethylene and acrylic acid having a melt index between 100 and 4000 serves as a conformable-release layer.

9 Claims, 2 Drawing Sheets

MELT TRANSFER WEB

This is a continuation of co-pending application Ser. No. 008,013 filed on Jan. 28, 1987, now abandoned.

BACKGROUND OF THE INVENTION

This invention relates generally to melt transfer webs and more particularly concerns an improved melt transfer web for transferring vinyl ink to surfaces of workpieces which surfaces are uneven.

It is well-known in melt transfer printing systems to print a pattern with printing inks having a thermoplastic binder onto paper and then to transfer the pattern onto a fabric or other surface under heat and pressure. Various releasable layer compositions have been developed to enhance efficient graphic pattern transfer onto fibrous or textile material workpieces without damaging physical properties, feel, and touch of the fabric. Such systems were developed in an attempt to overcome the problems associated with satisfying temperature requirements which may vary over a wide range as well as to accommodate the various steps of forming the transfer paper and of performing the heat transfer itself.

Margerum et al. patent 4,511,602 discloses a heat transfer web comprising a carrier substrate and a transfer layer of a pigmented polyolefin and a rosin ester. When the transfer layer is required to have any significant thickness, there is included in the transfer layer a low melting point wax or resin to provide flexibility. The transfer layer disclosed in the Margerum et al. patent is a polyolefin of low molecular weight, low softening point, and moderate viscosity.

Geurtsen et al. patent 4,555,436 discloses a heat transfer laminate which has a carrier substrate, a release layer, an optional barrier layer, an ink design, and a coating layer. During heat transfer the release layer splits from the carrier substrate and forms a protective coating over the transferred design. The release coating contains a montan wax, a rosin ester or hydrocarbon resin, a solvent, and ethylene-vinyl acetate copolymer having a low vinyl acetate content.

Martinovich patent 3,567,571 discloses a heat transfer laminate structure for transfer printing a thermoplastic resin article. The laminate includes a heat release film, a film of thermoplastic resin (polyolefin) compatible with the article to be printed, and an image to be transferred. Another optional resin film (polyolefin) may be laminated over the image itself. When the image is then transferred to the workpiece, it is protected by the two resin films.

Mizuno et al. patent 4,253,838 discloses a heat transfer printing sheet which incorporates a dye having poor heat transfer properties. The dye is mixed with an alkaline agent having a property of increasing the heat transferability property of the dye and a binder. A resin layer is coated over the dye through which the dye can be passed when the heat transfer is carried out. Alternatively, a resin layer may be provided between the dye and base sheet. The combination of a dye sandwiched between resin layers is said to achieve a superior color transfer and fastness.

Sideman patent 3,952,131 discloses a heat transfer print sheet having a polyolefin coating overlying the printed surface of the base sheet. A silicone release layer is provided on top of the polyolefin coating. The printed pattern on the base sheet transfers through the polyolefin coating upon application of heat and pressure. The polyolefin coating prevents the heat transfer print sheet from adhering to the surface of the workpiece, thereby allowing the printing to permeate into the interior of the workpiece to provide a wear-resistant print.

Keino et al. patent 4,515,849 discloses a transfer print sheet comprising a base sheet and a release resin layer with the ink pattern printed on the release resin layer. The pattern is printed with an elastic high polymer resin and pigment admixed therewith. The pattern is overlaid with a dissolving agent layer which will dissolve, erode, swell, and/or otherwise modify the synthetic fibers of the workpiece, thereby rendering the synthetic fabric to be printed locally receptive to the high polymer resin ink.

Magnotta patent 4,536,434 discloses a heat transfer laminate having a hot melt release layer, an ink layer, and an adhesive coating layer which is said to have improved release characteristics and to provide a protective coating on the imprinted article.

Magnotta patent 4,557,964 discloses a heat transfer laminate having the same basic structure as previously described in connection with the Magnotta patent 4,536,434 with an improved release coating which transfers the ink design and forms an optically clear protective coating over the transferred ink layer. The transferred release coating upon resolidification has an exceedingly high optical clarity with no hazing, spotting, or halo discernible over the transferred ink pattern. The release layer incorporates a tackifying resin in a wax base of montan wax and a crystalline wax such as paraffin wax.

Greenman et al. patent 4,235,657, which is assigned to the assignee of the present invention, discloses a melt transfer web useful for transfer printing graphic patterns onto natural synthetic fabric sheets. The transfer web of the Greenman et al. patent consists of a flexible substrate, a release layer applied to the top of the flexible carrier substrate, and a binder layer applied over the release layer. A pattern of ink is printed by conventional means on the binder layer. During the hot melt transfer process, the binder layer is released from the carrier substrate along with the ink and binds adhesively to the fabric to bind the ink to the fabric of the workpiece.

The transfer webs disclosed in the Greenman et al. patent can be used one on top of the other to print multiple-color patterns such as in the making of signs. For example, one web may be imprinted with a solid color (white for example) which is to be used for the letters in a sign, and the second web can be imprinted with a solid color (green for example) which is to be used for the background. The letters for the sign are cut out from the white web and laid on the workpiece surface. The green web is then laid over the letters. During the heat transfer process, the ink from both webs is transferred to the sign surface, producing white letters with a green background.

Because the release layer in the Greenman et al. patent includes a polyethylene wax, having a fairly low melt index, the wax in the webs used for the letters may seep out around the edges of the letters, thereby inhibiting printing of the background color adjacent the edges of the letters and producing a halo effect around the letters. The halo effect also results from the inability of the transfer web being used for the background color to conform around the thickness and edges of the transfer web which is used to print the underlying letters.

SUMMARY OF THE INVENTION

It is therefore an object of the present invention to provide an improved melt transfer web having a conformable layer which allows the transfer web to transfer an ink pattern to uneven workpiece surfaces.

It is a further object of the present invention to provide an improved melt transfer web having a release layer and a conformable layer with a relatively high melt index. With such an improved melt transfer web, a number of the transfer webs can be overlaid, one on top of the other, in order to print foreground and background colors around or through cutout portions without layer seepage and an undesirable halo effect around the cutout portions.

It is a further object of the present invention to provide an improved melt transfer web in which the conformable layer and release layer functions are accomplished by a single layer.

It is also an object of the present invention to provide an improved melt transfer web in which the release layer and conformable layer are of sufficient thickness to eliminate poor transfer or poor release resulting from hot or cold spots in the transfer presses.

It is also an object of the present invention to provide an improved melt transfer web which can be stripped from the workpiece either hot or after cooling.

In order to achieve the foregoing objects, one embodiment of the melt transfer web of the present invention includes a flexible carrier substrate with a conformable polymeric film layer imprinted on top of the surface of the carrier substrate. The conformable layer consists of copolymers of ethylene and vinyl acetate or copolymers of ethylene and acrylic acid which copolymers have a melt index greater than 30. In addition, a release layer may be provided on top of the conformable layer to assist in the transfer of the vinyl ink to the workpiece surface. The release layer consists of polyethylene films or ethylene copolymer films, such as ethylene-acrylic acid copolymers, ethylene-vinyl acetate copolymers having less than 30% vinyl acetate, ethylene-acrylic ester copolymers, ethylene-methacrylic ester copolymers, or ethylene-methacrylic acid copolymers.

In a second embodiment of the present invention, the separate release layer is eliminated in favor of a single conformable-release layer comprised of copolymers of ethylene and acrylic acid having a melt index between 100 and 4000.

Other objects and advantages of the invention will become apparent upon reading the following detailed description and upon reference to the drawings.

DETAILED DESCRIPTION OF THE INVENTION

While the invention will be described in connection with the preferred embodiment and method, it will be understood that I do not intend to limit the invention to that embodiment or method. On the contrary, I intend to cover all alternatives, modifications, and equivalents as may be included within the spirit and scope of the invention as defined by the appended claims.

Figure 1:
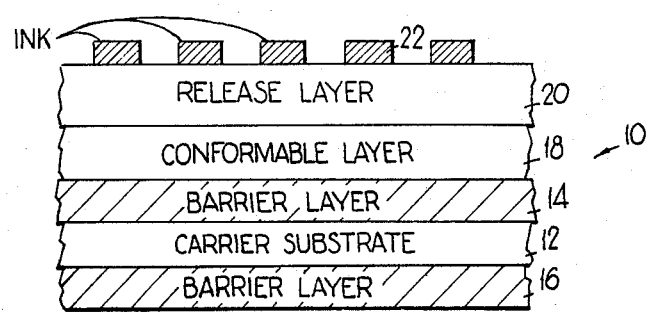
FIG. 1 is a fragmentary sectional view of a first embodiment of a melt transfer web made in accordance with the present invention.
Figure 4:
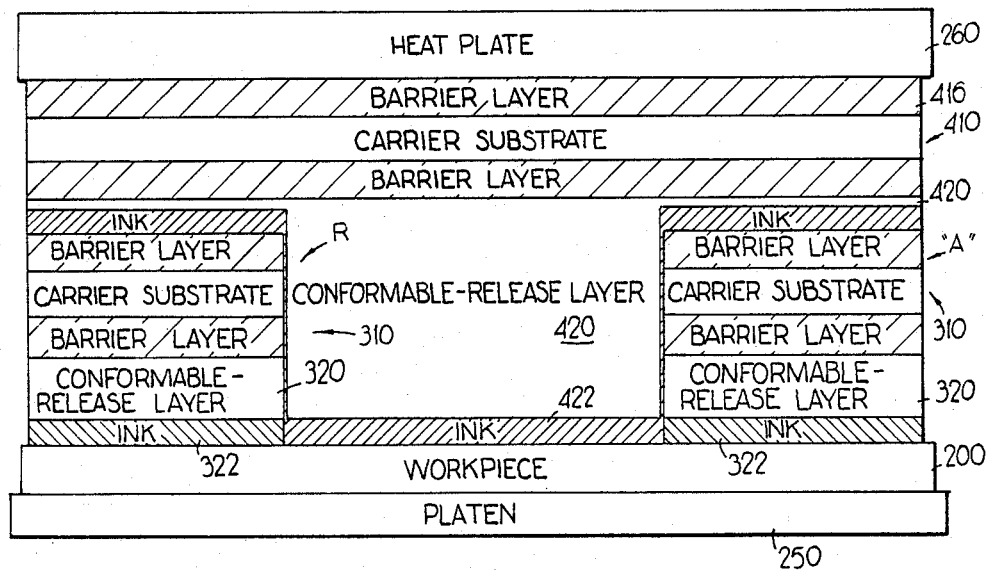
FIG. 4 is a fragmentary sectional view illustrating the printing process shown in FIG. 3.

Turning to FIG. 1, there is shown a fragmentary section of a melt transfer web 10 made in accordance with the present invention which includes a carrier substrate 12 sandwiched between a top barrier layer 14 and bottom barrier layer 16. A conformable layer 18 is coated on top of barrier layer 14, and a release layer 20 is coated on top of the conformable layer 18. A vinyl ink 22 is printed in conventional fashion on release layer 20. The vinyl ink may be applied in pattern or as a continuous layer as shown in FIG. 4 for the purpose of printing using overlays of a number of webs.

Substrate 12 is a thin, flexible, but non-elastic, sheet material such as one of the various paper webs, plastic films, or metal foils customarily employed in heat transfer paper which are not adversely affected by thermal conditions occurring during the heat transfer steps. For economic reasons, it is preferred that the carrier substrate 12 be a paper web, saturated with a nonstaining and nonthermosetting polymer. Illustratively, the preferred paper web is a water leaf sheet of wood pulp fibers or alpha-pulp fibers impregnated with a reactive acrylic polymer such as the products sold under the trade designation Hycar 2600×104 manufactured and sold in latex form by B. F. Goodrich Chemical Company of Cleveland, Ohio. The preferred carrier substrate has a basis weight of about 14.2 pounds per 1300 ft$^2$ before impregnation. The treated paper preferably contains 30 parts polymer per 100 parts fiber by weight, and has a basis weight of 18.5 pounds per 1300 ft$^2$. A suitable caliper is 4.1 mils plus or minus 0.5 mil.

A treated paper web with the above properties provides a reasonable low-cost web for carrier substrate 12 having suitable tensile strength and resistance against delamination to serve as a carrier substrate for an improved melt transfer web.

When using a paper for carrier substrate 12, it is preferred that a passive barrier coating material such as top barrier layer 14 and bottom barrier layer 16 be applied to each side of the carrier substrate. The barrier layer 14 prevents penetration of subsequent coatings between the fibers of the carrier substrate. The top barrier layer 14 thus helps aid easy release of the active coating materials in conformable layer 18 and release layer 20 during the heat transfer steps. The bottom barrier layer 16 serves primarily to provide dimensional stability to balance the sheet structure, and prevent curl which would occur if carrier substrate 12 were coated on only one side. A non-curling web is necessary particularly when printed patterns are applied to the transfer web by an offset printing process. Both barrier layers 14 and 16 covering the fibers of the web are further useful to prevent the occurrence of curl during the heat transfer process due to the loss of moisture from the carrier substrate 12 by evaporation.

A useful barrier coating composition may be comprised of a polymeric binder and a clay mixture. Illustratively, one such coating is comprised of a mixture of 25-50 parts of polymeric acrylic latex with 100 parts of clay such as the clay sold under the trade designation Ultrawhite 90 of Engelhard Mineral and Chemical Division of Mineral Park Edison, N.J. A suitable acrylic polymer is a self-cross-linking polymer sold under the trade designation of Rhoplex HA-16 of Rohm and Haas Company of Philadelphia, Pa., supplied as a non-ionic latex. Other polymer binders such as butadiene-styrene, butadiene-acrylonitrile, and polyvinyl acetate may be used with the clay. Alternatively the top barrier layer 14 may be composed of a water-based dispersion of an ethylene-acrylic acid copolymer, such as Primacor 483 manufactured by Dow Chemical Inc. of Midland, Mich. The barrier coatings 14 and 16 are applied by well known coating means at a thickness of between 0.45 to 0.75 mil.

The conformable layer 18 in FIG. 1 may be comprised of copolymers of ethylene and vinyl acetate or copolymers of ethylene and acrylic acid, both copolymers having melt indices greater than 30. Melt index is determined in accordance with ASTM Standard D1238-82, note 16. Illustratively, the preferred composition for conformable layer 18 is a wax modified ethylene-vinyl/acetate copolymer sold under the trade designation Elvax 3200 by DuPont Company, Wilmington, De. The conformable layer 18 may be applied as a hot melt or an extruded film at a thickness of 0.4 to 3 mils and preferably a thickness of 1.2 mils.

Because of the nature of the conformable layer, and its rheology, it will, when heated, soften and flow in order to allow the ink 22 to contact uneven workpiece surfaces.

The release layer 20 coated on top of the conformable layer 18 facilitates release of the vinyl ink 22 from the melt transfer web 10. The release layer may be comprised of polyethylene films or ethylene copolymer films such as ethylene-acrylic acid copolymers, ethylene-vinyl acetate copolymers having less that 30% vinyl acetate, ethylene-acrylic ester copolymers, ethylene-methacrylic ester copolymers, or ethylene-methacrylic acid copolymers such as Surlyn. The release coating may be applied as an extruded film or a hot melt at a thickness of 0.1 to 2.0 mils Preferably, the release layer is an ethylene-methacrylic acid copolymer sold under the trade designation Surlyn 1702 manufactured by DuPont Company, Wilmington, Del. Preferably, the release layer thickness is 1.0 mil.

The inks 22 are well know in the art and are printed onto the release layer by conventional means. Rotary screen printing is preferred. Generally, the inks are composed of vinyl resin, pigments, plasticizers and a solvent.

Figure 2:
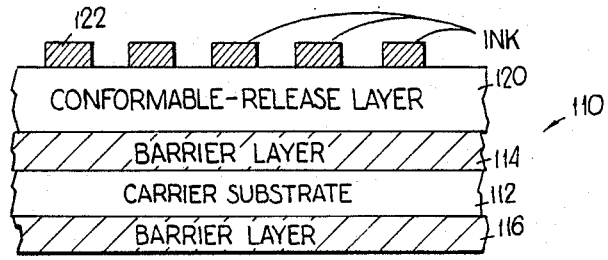
FIG. 2 is a fragmentary sectional view of a second embodiment of a melt transfer web made in accordance with the present invention.

Turning to FIG. 2, there is shown a second embodiment of a melt transfer web 110 which comprises a carrier substrate 112 sandwiched between a top barrier layer 114 and a bottom barrier layer 116. A composite conformable-release layer 120 is coated on top of the top barrier layer 114, and vinyl ink 122 is printed on top of the conformable-release layer 120 in any desired pattern or as a continuous layer. The carrier substrate 112 and barrier layers 114 and 116 are the same as the carrier substrate 12 and barrier layers 14 and 16 previously described in connection with the embodiment shown in FIG. 1. The composite of substrate 112 and barrier layers 114 and 116 is preferably the substrate and barrier layers incorporated in melt transfer webs sold under the trademark Trans-Eze ® by Kimberly-Clark Corporation of Roswell, Ga.

The conformable-release layer consists of copolymers of ethylene and acrylic acid having a melt index between 100 and 4000. Preferably the conformable-release layer is a single coating of Primacor 5991 manufactured by Dow Chemical of Midland, Mich. Primacor 5991 is an ethylene-acrylic acid copolymer having an acrylic acid content of 20% and a melt index of 3200. The Primacor 5991 may be coated onto the barrier layer 114 either as a water-based dispersion or a hot melt. The hot melt process is preferred because it provides a glossier, smoother surface for printing. The conformable-release layer 120 has a thickness between 0.4 and 3 mils and preferably has a thickness of 1.0 mils.

Figure 3:
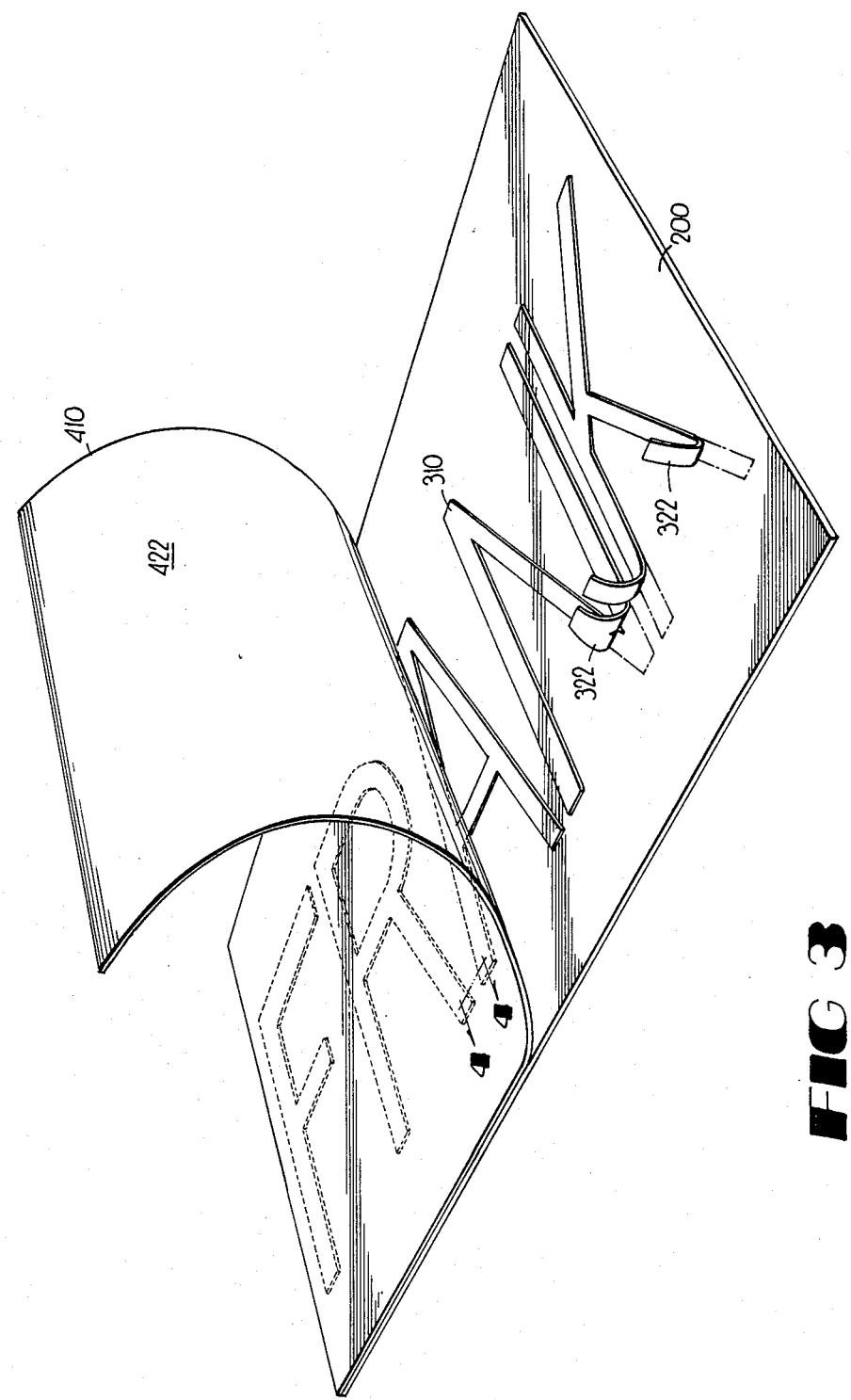
FIG. 3 is a perspective view illustrative of a method for printing signs using two melt transfer webs of the present invention.

FIG. 3 illustrates a method for printing signs and the like using two or more melt transfer webs of the present invention. Particularly, FIG. 3 illustrates a method by which the name "FRANK" can be printed onto the surface of a workpiece 200 such as a piece of vinyl. By way of illustration, the letters of the name "FRANK" will be printed in white, and the background will be printed in green. In order to accomplish the printing illustrated in FIG. 3, the letters F, R, A, N, and K are individually cut from a melt transfer web of FIG. 2 which has a continuous layer of white ink 322 printed on the surface of conformable-release layer 320. The letters are then laid ink side down onto the workpiece 200. A second melt transfer web 410, having a continuous layer of green ink 422, for example, printed on the surface of conformable-release layer 420, is then laid over the letters and the workpiece 200 with its ink side down. The workpiece and two melt transfer webs 310 and 410 are then placed between a canvas 250 and rubber bladder 260, as shown in FIG. 4, in a vacuum press.

Turning to FIG. 4, there is shown a cross-sectional view of the two transfer webs 310 and 410 in overlaid fashion on the workpiece 200. The canvas 250 underlies the workpiece 200 and the bladder 260 overlays barrier layer 416 of the melt transfer web 410. The melt transfer webs 310 and 410 are configured the same as melt transfer web 110 in FIG. 2 which has been previously described.

As heat and pressure are applied to the overlaying melt transfer webs 310 and 410, the conformable-release layer 420 begins to soften and flow in order to fill the gap between the two melt transfer webs 310 which make up the adjacent-lying portions of the letters "A" and "R" in the sign. As can be seen in FIG. 4, the conformable-release layer 420 of transfer web 410, as a result of heating and pressure, has been forced into and filled the space between the letters "A" and "R", so that the ink 422 of the transfer web 410 can contact the workpiece between the letters "A" and "R". As a result, the workpiece is imprinted with the white ink 322 of transfer web 310 where the letters "A" and "R" contact the workpiece as shown in FIG. 4, and the background is imprinted with the green ink 422 where the ink contacts the workpiece between the letters "A" and "R" of the sign.

Because the conformable-release layer 320 does not have a high concentration of wax, the conformable-release layer 320 in the letters "A" and "R" does not exude wax around the edges of the letters "A" and "R" to inhibit printing of the background ink 422 and to produce a halo effect around the letters. Consequently, once the heat transfer process has been carried out, and the melt transfer webs 310 and 410 have been removed, the workpiece has a green background (ink 422) and white letters (ink 322) spelling out the name "FRANK".

The melt transfer process parameters used in connection with the melt transfer web of the present invention are in the main standard. I have found that good transfers occur if the vacuum press is heated to a temperature of about 230° F. after assembling the vinyl and paper and evacuating. The temperature is maintained for about 5 minutes. I have also discovered that unlike the prior art processes, it is not desirable to strip the transfer webs from the workpiece immediately. In fact, I have found that the transfer webs should preferably be removed from the workpiece after the workpiece and ink have cooled to ambient temperature.

I have also discovered that the melt transfer webs of the present invention can withstand higher temperatures without being adversely affected during the melt transfer process.

For example, products such as Trans-Eze ® containing more wax in the conformable layer will exude wax onto the edges of the letters at higher temperatures. Hot spots often present in transfer process make the problem more severe and hard to control.

Also, since Trans-Eze ® has a relatively thin release coating over the wax-containing layer, poor release is often encountered at higher temperatures or in hot spots. It is thought that the thin release layer melts or is dissolved in these hot spots. The heavier, thicker release layer of the present invention eliminates these effects and extends the useful temperature range of the paper.

The materials mentioned as suitable for the release coating are somewhat conformable at the temperatures encountered in making transfers. Most less pliable materials such as cross-linked polymers or conventional latex coatings would not be conformable enough. This would negate the function of the conformable layer underneath.

I claim:

1. An improved melt transfer web for transferring vinyl ink to uneven contact surfaces, the web comprising:
   (a) a flexible substrate of a heat stable material having top and bottom surfaces;
   (b) a conformable polymeric film layer overlaying the top surface of the substrate and remaining attached thereto upon transfer of said vinyl ink to said uneven contact surfaces, said conformable polymeric film layer being comprised of a polymer selected from the group consisting of copolymers of ethylene and vinyl acetate and copolymers of ethylene and acrylic acid, wherein the copolymer has a melt index greater than 30, said conformable polymeric film layer allowing said vinyl ink to adapt to said uneven contact surfaces; and
   (c) a release polymeric film layer overlaying the conformable layer to receive and transfer said vinyl ink to said uneven contact surface, said release polymeric film being comprised of a polymer film selected from the group consisting of polyethylene films and ethylene copolymer films, said release polymeric film layer remaining attached to said conformable polymeric film layer upon transfer of said ink to said uneven contact surfaces.

2. The web of claim 1, wherein the ethylene copolymers are selected from the group consisting of ethylene-acrylic acid copolymers, ethylene-vinyl acetate copolymers having less than 30% by weight of vinyl acetate, ethylene-acrylic ester copolymers, ethylene-methacrylic ester copolymers, and ethylene-methacrylic acid copolymers.

3. The web of claim 1, wherein the conformable layer is from 0.4 to 3 mils thick and the release layer is 0.1 to 2 mils thick.

4. The web of claim 3, wherein the conformable layer is 1.2 mils thick and layer is 1.0 mil thick.

5. The web of claim 1, wherein the conformable layer is a wax modified ethylene-vinyl acetate copolymer having less than 30% by weight of vinyl acetate and the release layer is an ethylene-methacrylic acid copolymer.

6. An improved melt transverse web for transferring vinyl ink to uneven contact surfaces, the web comprising:
   (a) a flexible substrate of heat stable material having top and bottom surfaces; and
   (b) a conformable-release polymeric film layer overlaying the top surface of the substrate and comprised of a copolymer of ethylene and acrylic acid, wherein the copolymer has a melt index between 100 and 4000.

7. The web of claim 6, wherein the copolymer is an ethylene-acrylic acid copolymer having an acrylic acid content of 20% by weight and a melt index of 3,200.

8. The web of claim 6, wherein the conformable-release layer is 0.4 to 3 mils thick.

9. The web of claim 8, wherein the conformable-release layer is 1.0 mil thick.

* * * * *

UNITED STATES PATENT AND TRADEMARK OFFICE
CERTIFICATE OF CORRECTION

PATENT NO. : 4,863,781

DATED : September 5, 1989

INVENTOR(S) : Frank J. Kronzer

It is certified that error appears in the above-identified patent and that said Letters Patent is hereby corrected as shown below:

Column 5, line 43 "mils preferably" should read --mils. preferably--;

Column 5, line 48, "know" should read --known--; and

Column 8, line 26, "and layer" should read --and the release layer--.

Signed and Sealed this

Sixteenth Day of March, 1993

Attest:

STEPHEN G. KUNIN

Attesting Officer

Acting Commissioner of Patents and Trademarks